United States Patent
Dylmer

(10) Patent No.: US 9,781,239 B2
(45) Date of Patent: Oct. 3, 2017

(54) CORDED-CORDLESS HEADSET SOLUTION

(71) Applicant: GN Audio A/S, Ballerup (DK)

(72) Inventor: Henrik Dylmer, Ballerup (DK)

(73) Assignee: GN AUDIO A/S (DK)

( * ) Notice: Subject to any disclaimer, the term of this patent is extended or adjusted under 35 U.S.C. 154(b) by 0 days.

(21) Appl. No.: 15/284,674

(22) Filed: Oct. 4, 2016

(65) Prior Publication Data

US 2017/0104859 A1    Apr. 13, 2017

(30) Foreign Application Priority Data

Oct. 8, 2015    (EP) .................................... 15188942

(51) Int. Cl.
    *G08B 1/08*    (2006.01)
    *H04M 1/05*    (2006.01)
    (Continued)

(52) U.S. Cl.
    CPC ............ *H04M 1/05* (2013.01); *G08B 21/182* (2013.01); *H04M 1/7253* (2013.01); *G08B 3/10* (2013.01); *G08B 5/22* (2013.01)

(58) Field of Classification Search
    CPC .... H04M 1/05; H04M 1/7253; G08B 21/182; G08B 3/10; G08B 5/22
    (Continued)

(56) References Cited

U.S. PATENT DOCUMENTS 5,715,308 A * 2/1998 Shankarappa ......... H04M 11/04
                                                     340/328
5,991,645 A    11/1999 Yuen et al.
(Continued)

FOREIGN PATENT DOCUMENTS

CN    100508492    9/2004
EP    2541882    1/2013
(Continued)

OTHER PUBLICATIONS

Jabra PRO™ 9450, Jabra PRO™ 9450 Flex, Jabra PRO™ 9450 Duo User Manual, dated Jan. 2015, GN Netcom A/S.
(Continued)

*Primary Examiner* — Naomi Small
(74) *Attorney, Agent, or Firm* — Altera Law Group, LLC

(57) ABSTRACT

Disclosed is a method and a hands free communication system comprising a first system part and a second system part, wherein the first system part comprises a first connector part and a first transceiver, and the second system part comprises a second connector part and a second transceiver, whereby the first system part and the second system part are configured to be connected in a corded mode by means of the first and second connector parts, whereby the first system part and the second system part are configured to be connected in a wireless mode by means of the first and second transceivers, wherein the hands free communication system comprises detecting means for detecting whether the first system part and the second system part are in a certain vicinity of each other, when the hands free communication system is in the wireless mode, and wherein, the hands free communication system comprises alert means to alert a user of the hands free communication system, when the detecting means detects that the first and second system parts are within the certain vicinity of each other while the hands free communication system is in the wireless mode.

20 Claims, 6 Drawing Sheets

(51) Int. Cl.
*H04M 1/725* (2006.01)
*G08B 21/18* (2006.01)
*G08B 5/22* (2006.01)
*G08B 3/10* (2006.01)

(58) Field of Classification Search
USPC .................................................. 340/539.13
See application file for complete search history.

(56) References Cited

U.S. PATENT DOCUMENTS

| | | | |
|---|---|---|---|
| 6,823,188 B1 * | 11/2004 | Stern | G08G 1/0962 |
| | | | 455/41.2 |
| 8,209,441 B1 | 6/2012 | Brockway et al. | |
| 8,798,042 B2 | 8/2014 | Kannappan | |
| 2006/0068857 A1 | 3/2006 | Asseily | |
| 2008/0057857 A1 | 3/2008 | Smith | |
| 2008/0167087 A1 * | 7/2008 | Tang | H04M 1/05 |
| | | | 455/569.1 |
| 2009/0010246 A1 | 1/2009 | Grattan et al. | |
| 2009/0096683 A1 * | 4/2009 | Rosenblatt | H01Q 1/242 |
| | | | 343/702 |
| 2011/0169654 A1 | 7/2011 | Ketari | |
| 2011/0207447 A1 | 8/2011 | Bhow | |
| 2012/0244812 A1 | 9/2012 | Rosener | |
| 2016/0316500 A1 * | 10/2016 | Aliyar | H04W 48/18 |

FOREIGN PATENT DOCUMENTS

| | | |
|---|---|---|
| EP | 2680550 | 1/2014 |
| EP | 2905949 | 8/2015 |
| WO | WO2008/082939 | 7/2008 |
| WO | WO2013/177013 | 11/2013 |

OTHER PUBLICATIONS

European Search Report dated Apr. 25, 2016 for European Patent application No. EP15188942.
CS510™/CS520™—Wireless Headset System—User Guide, publication date Jan. 2013, author Plantronics, Inc.

* cited by examiner

CORDED-CORDLESS HEADSET SOLUTION

FIELD

The present disclosure relates to a hands free communication system comprising a first system part, such as a headset, and a second system part, such as a headset base or pc, configured to be connected in a corded mode and in a wireless mode.

BACKGROUND

Too many DECT headset users concentrated in offices or call centers create density problems, and the density problems increase as time goes. Different solutions have been proposed to solve the problem, such as dual mode headset shifting between Bluetooth and DECT. Other solutions are combining corded mode and wireless mode between the headset and the headset base or pc. When the user is sitting at his pc, he plugs his headset into the corded mode. When he moves away, he unplugs the headset, whereby the headset switches to operate in the wireless mode.

SUMMARY

However, it is a problem if the user does not plug in the headset to the headset base or pc, when he is at his computer, since then headset stays in wireless mode, which creates density problems.

There is a need for an improved solution to the density problems caused by using wireless headsets, such as in offices or call centers where many headset users are present.

Disclosed is a hands free communication system comprising a first system part and a second system part. The first system part comprises a first connector part and a first transceiver. The second system part comprises a second connector part and a second transceiver. The first system part and the second system part are configured to be connected in a corded mode by means of the first and second connector parts. The first system part and the second system part are configured to be connected in a wireless mode by means of the first and second transceivers. The hands free communication system comprises detecting means for detecting whether the first system part and the second system part are in a certain vicinity of each other, when the hands free communication system is in the wireless mode. The hands free communication system comprises alert means to alert a user of the hands free communication system, when the detecting means detects that the first and second system parts are within the certain vicinity of each other while the hands free communication system is in the wireless mode.

According to an aspect disclosed is a method performed in a hands free communication system. The hands free communication system comprises a first system part and a second system part. The first system part comprises a first connector part and a first transceiver. The second system part comprises a second connector part and a second transceiver. The first system part and the second system part are configured to be connected in a corded mode by means of the first and second connector parts. The first system part and the second system part are configured to be connected in a wireless mode by means of the first and second transceivers. The method comprises detecting whether the first system part and the second system part are in a certain vicinity of each other, when the hands free communication system is in the wireless mode, by means of detecting means in the hand free communication system. The method comprises alerting a user of the hands free communication system, when the detecting means detects that the first and second system parts are within the certain vicinity of each other while the hands free communication system is in the wireless mode, by means of alert means in the hands free communication system.

According to an aspect disclosed is also a first system part of a hands free communication system. The first system part comprises a first connector part and a first transceiver. The first system part is configured to be connected with a second system part, where the second system part comprises a second connector part and a second transceiver. The first system part is configured to be connected with the second system part in a corded mode of the hands free communication system by means of the first and second connector parts. The first system part is configured to be connected with the second system part in a wireless mode of the hands free communication system by means of the first and second transceivers. Detecting means of the hands free communication system is configured for detecting whether the first system part and the second system part are in a certain vicinity of each other, when the hands free communication system is in the wireless mode. Alert means of the hands free communication system is configured to alert a user of the hands free communication system, when the detecting means detects that the first and second system parts are within the certain vicinity of each other while the hands free communication system is in the wireless mode.

According to an aspect disclosed is a method performed in a first system part of a hands free communication system. The first system part comprises a first connector part and a first transceiver. The first system part is configured to be connected with a second system part, where the second system part comprises a second connector part and a second transceiver. The first system part is configured to be connected with the second system part in a corded mode by means of the first and second connector parts. The first system part is configured to be connected with the second system part in a wireless mode by means of the first and second transceivers. The method comprises detecting whether the first system part and the second system part are in a certain vicinity of each other, when the first system part and the second system part operate in the wireless mode, by means of detecting means in at least the first system part. The method comprises alerting a user of the hands free communication system, when the detecting means detects that the first and second system parts are within the certain vicinity of each other while the first and second system parts operate in the wireless mode, by means of alert means in at least the first system part.

According to an aspect disclosed is a hands free communication system comprising at least a first system part, such as a headset or speakerphone, where the first system part is configured to be connected with a second system part, such as a computer or headset base, and where the first system part is configured for switching between communicating in a corded mode and in a wireless mode with the second system part.

The first system part is configured for:
  communicating in the corded mode when the first system part is wired or plugged to the second system part, when a user carrying or wearing the headset is in a vicinity of the second system part;
  communicating in the wireless mode when the first system part is wirelessly connected, such as unwired or unplugged from the second system part, when the user is not in the vicinity of the computer;

wherein an alert is issued requesting the user to communicate and/or connect in the corded mode, i.e. to wire or plug the headset to the second system part, when the first system part, and thereby the user, is in the vicinity of the second system part, and it is detected that the first system part is not wired or plugged to the second system part.

The method and hands free communication system and first system part as disclosed provides a solution to the density problem, as it is detected when the first system part, e.g. worn as a headset by the user, is in a certain vicinity of the second system part, e.g. computer or headset base, and the first and the second system parts operate or communicate in the wireless mode. When the first and second system parts are close together and it is possible to connect them in a wired or corded mode by means of a wire or plug, then the user should operate the system parts in the corded mode to free up wireless channels, e.g. DECT channels or BT channels, for other users, such as colleagues on the same office building or in the call centre. If the user fails to connect or wire the first and second system parts, when it is detected by the system that the first and second system parts are in the certain vicinity of each other, then an alert is provided requesting the user to plug together the first system part to the second system part and operate the system parts in the corded mode, freeing up wireless channels to avoid density problems.

For example when the headset user is in the certain vicinity of his PC a voice, for example in the headset earphone, says: "Please plug your headset". If the user fails to plug in the first system part to the second system part, the voice for example says: "Please plug in your headset in order to free up wireless channels for your colleagues and improve audio quality".

As an addition or alternative to an audio alert such as the voice disclosed above, a visual alert may be provided, such as a visual alert in the form of a text message on a display of the second system part saying "Please plug your headset", and so on if the user fails to connect the system parts on the corded mode. A visual alert may additionally and/or alternatively be a flashing light on the second system part. A visual alert should be visible to the user when he is at his computer or headset base.

The first system part may be a headset, a speakerphone, a headphone, a microphone etc.

The second system part may be a personal computer (pc), a laptop, a tablet computer, a headset base, a dongle, where the dongle may be a part of a cable, etc.

The first connector part may be a plug and/or socket configured for connecting an electrical wire or cord between the first system part and a second connector part of the second system part, and/or for connecting the first system part and an intermediate system part, where the intermediate system part is configured for being connected with the second connector part of the second system part.

The second connector part may be a plug and/or socket configured for connecting an electrical wire or cord between the second system part and the first connector part of the first system part, and/or for connecting the second system part and an intermediate system part, where the intermediate system part is configured for being connected with the first system part.

The first and/or second connector parts may be female connectors. The first and/or second connector parts may be male connectors.

The first system part and the second system part are configured to be connected in a corded mode by means of the first and second connector parts. Thus the first and the second connector parts may be connected by a wire or cord. A first end of the wire or cord may be connected in the first connector part of the first system part. A second end of the wire or cord may be connected in the second connector part of the second system part. The first and/or second connector parts may be connected via a wire or cord to an intermediate system part. The intermediate system part may be a common connection point for the first and second system parts, for example if the first system part is a headset, and the second system part is a computer, the intermediate system part may be a headset base. The first and second system parts may thus not be connected or configured to be connected directly with each other. The first and the second system part may be connected or configured to be connected directly with the intermediate system part.

The detecting means may be received signal strength indicator (RSSI) measurements, infra-red (IR) means, radio frequency identification (RFID) means, optical means such as a camera in the pc or laptop, means detecting activity of the user on the pc such as the user typing on the pc, etc.

The alert means may be audio alert, visual alert such as light, such as flashing light, such as text.

Communication or connection in the wireless mode is capable of transferring data, such as communication data, such as audio and/or voice communication data between the first and the second transceiver.

The first and second transceivers may be any conventional transceivers capable of providing a wireless link there between, the wireless link being capable of transferring data, such as communication data, such as audio and/or voice communication data between the two transceivers. The wireless link may be any link, such as a radio link, such as a link according to any wireless standard such as a Bluetooth standard, a wireless standard, such as a standard according to 802.11b-g, such as a wireless USB, such as a PHS link or DECT link specifically configured for voice communication, etc.

In some embodiments the alert means is configured to provide a predefined number of alerts.

In some embodiments each alert of the predefined number of alerts is configured to be intensified relative to the previous alert. For example the power of the alert is configured to be intensified. For example if the alert is a visual alert, such as a flashing light, each alert is configured to emit a more powerful light than the previous alert. For example if the alert is an audible alert, each alert is configured to be louder than the previous alert. For example if the alert is a visual alert, which is a written text message, the each alert is configured to be displayed with a bigger font, i.e. bigger letters of the text message.

In some embodiments each alert of the predefined number of alerts is configured to be provided within a shorter time interval than the time interval between the previous alerts. Thus the pause between the repeated alerts may be shorter and shorter.

It is an advantage of the repeated alerts that these alert may stress or put pressure or encourage or stimulate the user to connect the first and the second system parts.

In some embodiments the wireless mode is configured to be disconnected, if the first and second connector parts are not connected after a predefined number of repeated alerts requesting the user to connect the first system part and the second system part. It is an advantage that wireless mode can be disconnected if the user does not respond to the alert to operate the parts in the corded mode, when it is possible due the parts being in the certain vicinity of each other. When the user wearing or holding the first system part is close enough the second system part to wire the two parts, the wireless communication channel should be made available to other users which are not being close enough to their second system part to connect their first and second system part. When the user knows that that his wireless connection will be disconnected if he fails to plug the system parts together, he will probably be more aware and remember to plug his parts together when possible to avoid being disconnected.

In some embodiments the wireless mode is provided via a radio connection, such as a connection according to any wireless standard, such as a Bluetooth standard and/or such as a digital enhanced cordless telecommunication (DECT) standard specifically configured for voice communication.

Digital enhanced cordless telecommunication (DECT) is a standard primarily used for creating cordless phone systems. DECT may be used in home and small office systems, and is also available in many PBX systems for medium and large businesses. The DECT standard includes a standardized interoperability profile for simple telephone capabilities, called GAP, which most manufacturers implement. GAP-conformance enables DECT handsets and bases from different manufacturers to interoperate at the most basic level of functionality, that of making and receiving calls. The standard also contains several other interoperability profiles, for data and for radio local-loop services.

The DECT standard fully specifies a means for a portable unit, such as a cordless telephone, to access a fixed telecoms network via radio, but does not specify any internal aspects of the fixed network itself. Connectivity to the fixed network, that may be of many different kinds, is done through a base station or "Radio Fixed Part" to terminate the radio link, and a gateway to connect calls to the fixed network. In most cases the gateway connection is to the public switched telephone network or telephone jack, although connectivity with newer technologies such as Voice over IP has become available.

DECT operates in the 1880-1900 MHz band and defines ten channels from 1881.792 MHz to 1897.344 MHz with a band gap of 1728 kHz. Each base station frame provides 12 duplex speech channels, with each time slot occupying any channel. DECT operates in multicarrier/TDMA/TDD structure. DECT also provides Frequency-hopping spread spectrum over TDMA/TDD structure. If frequency-hopping is avoided, each base station can provide up to 120 channels in the DECT spectrum before frequency reuse. Each timeslot can be assigned to a different channel in order to exploit advantages of frequency hopping and to avoid interference from other users in asynchronous fashion.

Bluetooth (BT) is a wireless technology standard for exchanging data over short distances, using short-wavelength UHF radio waves in the ISM band from 2.4 to 2.485 GHz, from fixed and mobile devices, and building personal area networks (PANs). Bluetooth operates at frequencies between 2400 and 2483.5 MHz, including guard bands 2 MHz wide at the bottom end and 3.5 MHz wide at the top. This is in the globally unlicensed, but not unregulated, Industrial, Scientific and Medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHz. Bluetooth 4.0 uses 2 MHz spacing, which accommodates 40 channels. The first channel starts at 2402 MHz and continues up to 2480 MHz in 1 MHz steps. It usually performs 1600 hops per second, with Adaptive Frequency-Hopping (AFH) enabled.

Bluetooth Low Energy, also called Bluetooth LE, BTLE, BLE or Bluetooth Smart technology, operates in the same spectrum range, the 2.400 GHz-2.4835 GHz ISM band, as Classic Bluetooth technology, but uses a different set of channels. Instead of the Classic Bluetooth 79 1-MHz channels, Bluetooth Smart has 40 2-MHz channels. Within a channel, data is transmitted using Gaussian frequency shift modulation, similar to Classic Bluetooth's Basic Rate scheme. The bit rate is 1 Mbit/s, and the maximum transmit power is 10 mW.

In some embodiments the detecting means is provided in the first system part and/or in the second system part. Thus the detecting means may be provided in the first system part, e.g. a headset. Alternatively and/or additionally the detecting means may be provided in the second system part, e.g. a pc or headset base. The detecting means may be provided as a unit, such as a software and/or hardware unit, in e.g. the headset, and/or as a hardware unit on a cord or wire from the headset, and/or as a unit, e.g. software or hardware unit, in the headset base or computer, such as a unit implemented in the processor of the second system part, and/or such as a unit on a surface of the first and/or second system part.

In some embodiments the disconnection of the wireless mode is provided by switching off transmission from the first and second transceiver. The disconnection of the wireless mode may for example be performed after three alerts, e.g. as a penalty to the user for not wiring the first and the second system parts when possible, i.e. when the first and the second system parts are in the certain vicinity of each other. The disconnection may also be performed when the first and second system parts are connected in the corded mode.

In some embodiments the alert means is provided in the first system part and/or in the second system part. Thus the alert may be provided in the first system part, e.g. a headset. Alternatively and/or additionally the alert means may be provided in the second system part, e.g. a pc or headset base. The alert means may be provided as a unit, such as a software and/or hardware unit, in e.g. the headset, and/or as a hardware unit on a cord or wire from the headset, and/or as a unit, e.g. software or hardware unit, in the headset base or computer, such as a unit implemented in the processor of the second system part, and/or such as a unit on a surface of the first and/or second system part.

In some embodiments the alert is an audio alert.

In some embodiments the audio alert is a voice alert in the first system part

In some embodiments the alert is a visual alert.

In some embodiments the visual alert is a light alert or a text alert, such as a flashing light in the first system part or second system part and/or a written alert on a display of the second system part. Thus the alert may be a light may be flashing in the first system part, e.g. a headset, which may be visual to the user of the headset when wearing the headset. The alert may be visible on a display for the user to read when he is at his pc or headset base.

In some embodiments the predefined number of repeated alerts is three. The predefined number of repeated alerts may be one, two, four, five etc.

In some embodiments the detecting means is configured to detect the certain vicinity as a presence and/or proximity between the first system part and the second system part.

In some embodiments the detecting means is a software application or program on the second system part, such as Skype, Skype for business, Microsoft Lync, Microsoft Messenger etc. Detecting the presence of the user wearing the first system part, i.e. the user being active in or on or with the second system part may be performed or achieved e.g. by detecting the user typing on the computer keyboard or touching the computer mouse etc.

In some embodiments the detecting means is a received signal strength indicator (RSSI) measuring the power present in a received radio signal from the first system part to the second system part. Thus if the power of the received radio signal exceeds a certain or predefined threshold, then the first and the second system part are determined to be within the certain vicinity of each other.

The RSSI may be a component build into a chip, such as a Bluetooth chip, of the first and/or second system part.

In some embodiments the detecting means comprises a radio-frequency identification (RFID) tag in at least one of the first system part or the second system part and an RFID reader in at least the other system part. The other system part is thus the second system part or the first system part, respectively. The RFID tag, e.g. an active RFID tag, may be configured for transmitting electromagnetic fields to be received by the RFID reader in the first or second system part. The RFID tag, e.g. a passive RFID tag, may be configured for changing another transmission without actively transmitting electromagnetic fields itself.

In some embodiments the certain vicinity between the first system part and the second system part is a predefined distance, such as one meter, two meters, three meters, four meters, five meters etc.

In some embodiments the certain vicinity between the first system part and the second system part is defined as being within a distance corresponding to the length of a cord or wire configured for connecting the first connector part and the second connector part. Thus the certain vicinity may be defined as a distance corresponding to where a typical cord can reach.

In some embodiments if the detecting means detects that the first system part and the second system part are not in a certain vicinity of each other anymore before the predefined number of alerts is provided, the wireless mode is not disconnected. Thus if the user wearing the first system part moves away from the second system part within a predefined time interval, e.g. corresponding to the time interval defined by the predefined number of alerts, the connection is not disconnected, as the user is not close anymore enough to plug med system parts together, and thus he is allowed to use the wireless mode for communication.

In some embodiments the first system part is a headset.

In some embodiments the first system part comprises the detecting means.

In some embodiments herein the first system part comprises the alert means.

The present invention relates to different aspects including the hands free communication system described above and in the following, and corresponding first system parts, second system parts, intermediate system parts, methods, devices, systems, networks, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
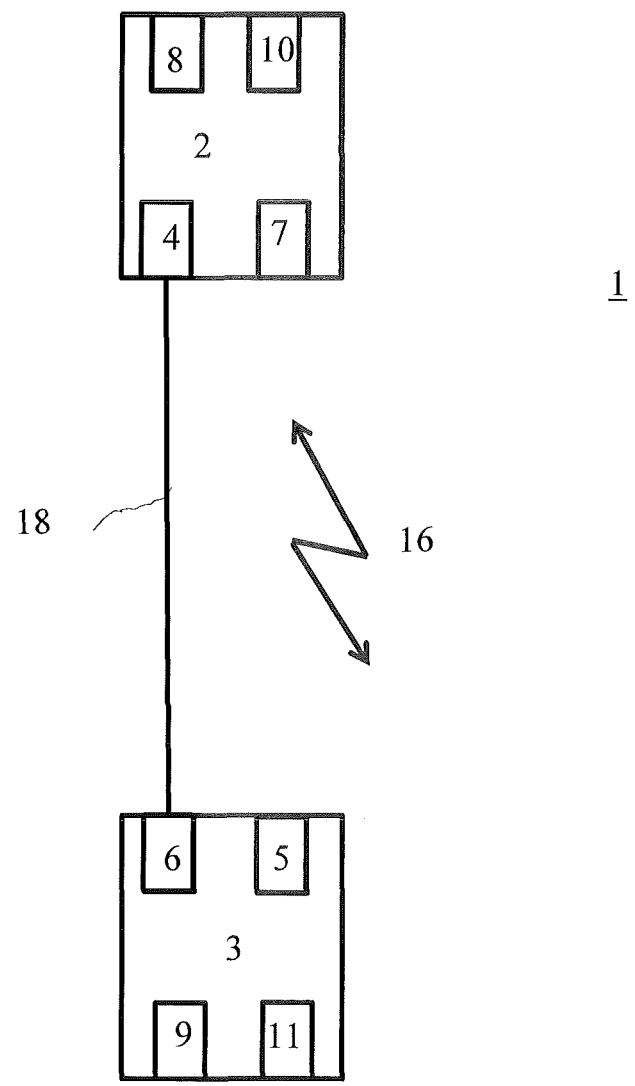
FIG. 1 schematically illustrates an example of a hands free communication system.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 schematically illustrates an example of a hands free communication system 1. The hands free communication system comprises a first system part 2 and a second system part 3.

The first system part 2 comprises a first connector part 4 and a first transceiver 7. The first system part 2 may be a headset, a speakerphone, a headphone, and/or a microphone etc.

The second system part 3 comprises a second connector part 6 and a second transceiver 5. The second system part 3 may be a personal computer (PC), a laptop, a tablet, a headset base, and/or a dongle etc.

The first system part 2 and the second system part 3 are configured to be connected in a corded mode 18 by means of the first connector part 4 and the second connector part 6. The first 4 and second 6 connector parts may be connected in the corded mode 18 by means of a cord or wire 18 connecting the first 4 and second 6 connector parts.

The first system part 2 and the second system part 3 are configured to be connected in a wireless mode 16 by means of the first transceiver 7 and the second transceiver 5. The hands free communication system 1 comprises detecting means 8, 9 for detecting whether the first system part 2 and the second system part 3 are in a certain vicinity of each other, when the hands free communication system 1 is in the wireless mode 16.

The detecting means 8, 9 may be a first detecting means 8 of the first system part 2 and a second detecting means 9 of the second system part 3. The detecting means 8, 9 may be a received signal strength indicator (RSSI) performing RSSI measurements, infra-red (IR) detecting means, radio-frequency identification (RFID) means, and/or optical means, such as a laptop camera etc.

For example, an RSSI detecting means 8, 9 may be a component build into a chip, such as a Bluetooth chip, of the first and/or second system part. The RSSI may therefore not be a separate, external or visual sensor or component or unit in the first and/or second system part 2, 3. Thus the shown component for the detecting means 8, 9 in FIG. 1 and in the subsequent FIGS. 2-4 may therefore merely be understood as a symbol indicating the presence of a feature, e.g. an RSSI, detecting means in the first and/or second system part, e.g. in the headset and/or headset base and/or pc.

The hands free communication system comprises alert means 10, 11 configured to alert a user of the hands free communication system 1, when the detecting means 8, 9 detects that the first 2 and second 3 system parts are within the certain vicinity of each other while the hands free communication system 1 is in the wireless mode 16. The alert means 10, 11 may be a first alert means 10 of the first system part 2 and a second alert means 11 of the second system part 3. The alert means 10, 11 may be audio such as sounds or music or voice, and/or visual such as light such as flashing light, and/or text such as a sentence reading "please plug your headset to your computer".

Figure 2:
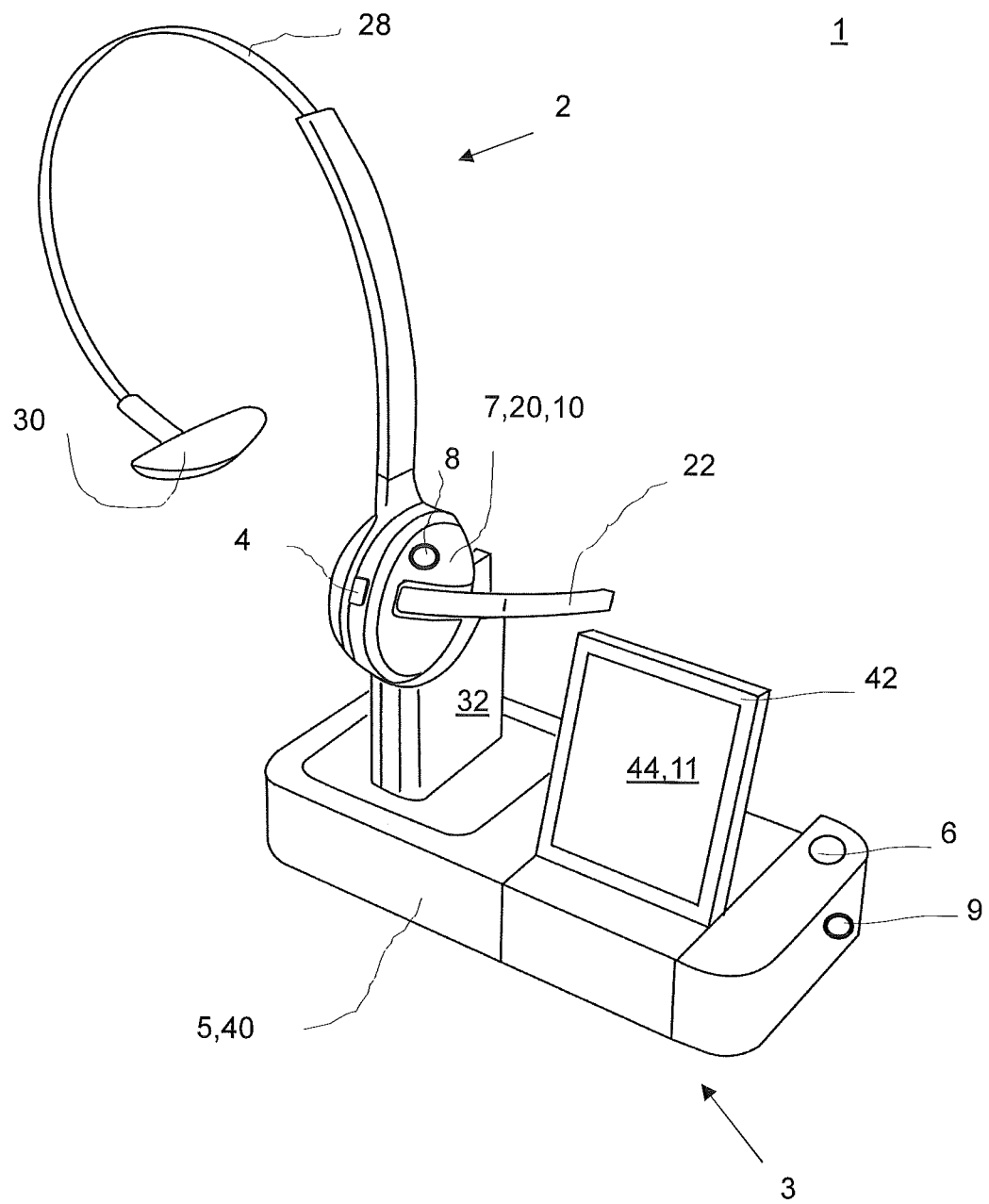
FIG. 2 schematically illustrates an example of a hands free communication system comprising a headset and a headset base.

FIG. 2 schematically illustrates an example of a hands free communication system 1. The hands free communication system comprises a first system part 2 and a second system part 3.

The first system part 2 is illustrated as a headset 2 comprising an earphone 20 configured to be placed over the ear of a user such that the user can hear audio transmitted to the headset, a microphone boom 22 attached to the earphone, where the microphone boom 22 comprises one or more microphones for capturing the voice of the user, a headband 28 configured to rest on the top of the head of the user wearing the headset, and a part 30 supporting the headset to the head of the user at the ear opposite the ear where the earphone 20 is placed. The headset 2 may further comprise a detecting means 8, which may detect the vicinity of the second system part 3. The detecting means 8 may for example be a received signal strength indicator (RSSI) performing RSSI measurements, infra-red (IR) detecting means, and/or radio-frequency identification (RFID) means. The headset 2 may further comprise an alert means 10, which may provide an audio alert to the user through the earphone 20. The second system part 3 is illustrated as a headset base 3 comprising a bottom 40, a stand 32 for holding the headset 2 when the headset is not in use on the users head, a display 42 comprising a screen 44. The screen 44 may be configured for displaying visual alerts such as text or flashing light to the user by means of alert means 11, when a detecting means 9 of the base 3 has detected a certain vicinity of the headset 2, and the headset 2 and the base 3 operates in a wireless mode. The detecting means 9 may for example be a received signal strength indicator (RSSI) performing RSSI measurements, infra-red (IR) detecting means, and/or radio-frequency identification (RFID) means.

The first system part 2 and the second system part 3 are configured to be connected in the wireless mode 16 (not shown) by means of a first transceiver 7 in the first system part and a second transceiver 5.

The headset 2 and the headset base 3 are configured to be connected in a corded mode 18 (not shown) by means of a first connector part 4 in the headset 2 and a second connector part 6 in the headset base 3, where the first connector part 4 and the second connector part 6 are configured to be connected to each other by means of a wire or cord (not shown).

Figure 3:
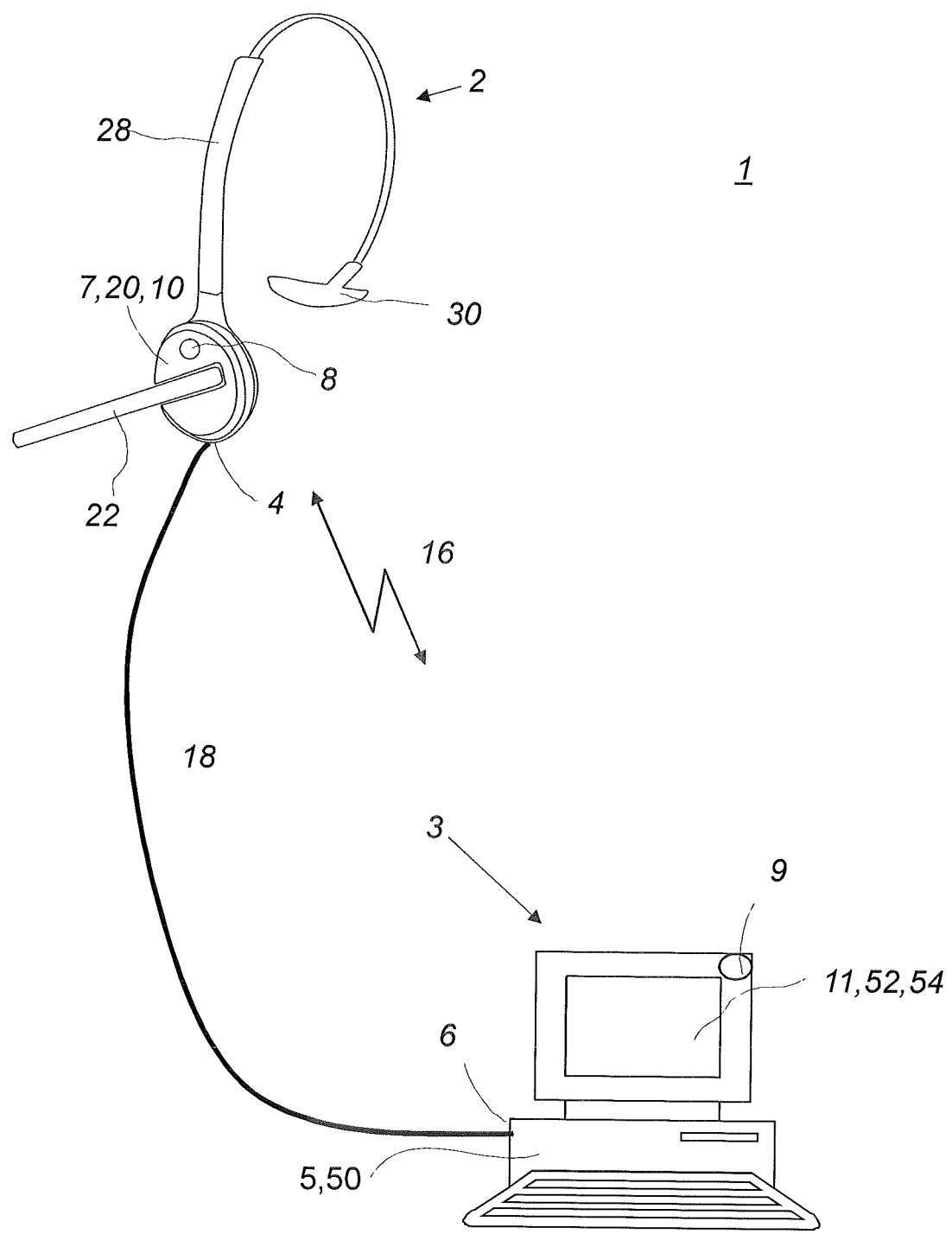
FIG. 3 schematically illustrates an example of a hands free communication system comprising a headset and a pc.

FIG. 3 schematically illustrates an example of a hands free communication system 1. The hands free communication system comprises a first system part 2 and a second system part 3.

The first system part 2 is illustrated as a headset 2 comprising an earphone 20 configured to be placed over the ear of a user such that the user can hear audio transmitted to the headset, a microphone boom 22 attached to the earphone, where the microphone boom 22 comprises one or more microphones for capturing the voice of the user, a headband 28 configured to rest on the top of the head of the user wearing the headset, and a part 30 supporting the headset to the head of the user at the ear opposite the ear where the earphone 20 is placed. The headset 2 may further comprise a detecting means 8, which may detect the vicinity of the second system part 3. The detecting means 8 may for example be a received signal strength indicator (RSSI) performing RSSI measurements, infra-red (IR) detecting means, and/or radio-frequency identification (RFID) means. The headset 2 may further comprise an alert means 10, which may provide an audio alert to the user through the earphone 20. The second system part 3 is illustrated as a personal computer (pc) 50 comprising a display 52 comprising a screen 54. The screen 54 may be configured for displaying visual alerts such as text or flashing light to the user by means of alert means 11, when a detecting means 9 of the pc 3 has detected a certain vicinity of the headset 2, and the headset 2 and the pc 3 operates in a wireless mode. The detecting means 9 may for example be a camera on the pc 3. The detecting means 9 may for example be a received signal strength indicator (RSSI) performing RSSI measurements, infra-red (IR) detecting means, and/or radio-frequency identification (RFID) means. The pc 3 may additionally or alternatively be configured for providing audio alerts to the user by means of for example a loudspeaker (not shown) in the pc.

The headset 2 and the pc 3 are configured to be connected in the wireless mode 16 by means of a first transceiver 7 in the headset and a second transceiver 5 in the pc.

The headset 2 and the pc 3 are configured to be connected in a corded mode 18 by means of a cord or wire connecting a first connector part 4 in the headset 2 and a second connector part 6 in the pc 3.

Figure 4:
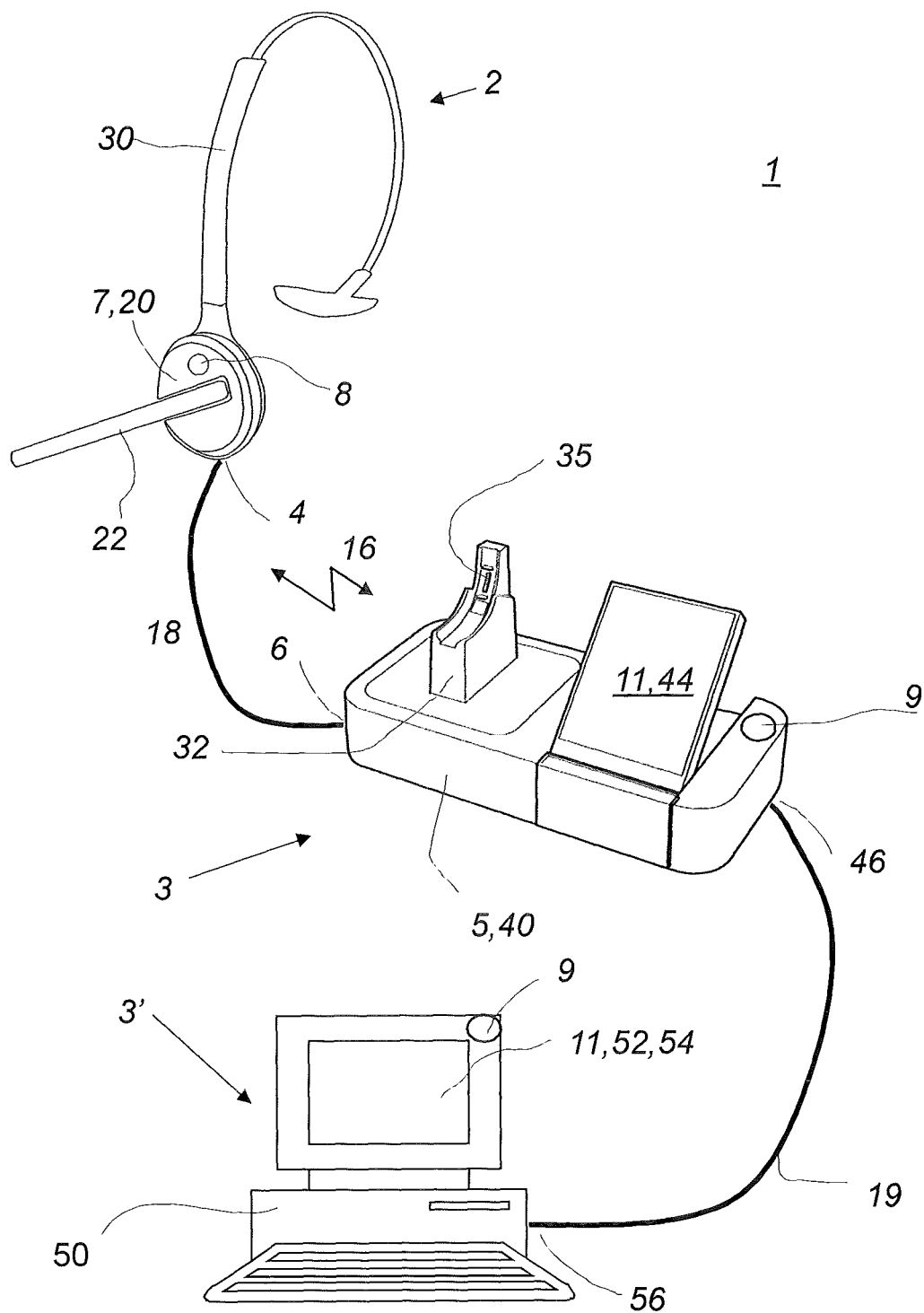
FIG. 4 schematically illustrates an example of a hands free communication system comprising a headset, a headset base and a pc.

FIG. 4 schematically illustrates an example of a hands free communication system 1. The hands free communication system comprises a first system part 2 and two second system parts 3, 3'.

The first system part 2 is illustrated as a headset 2 comprising an earphone 20 configured to be placed over the ear of a user such that the user can hear audio transmitted to the headset, a microphone boom 22 attached to the earphone, where the microphone boom 22 comprises one or more microphones for capturing the voice of the user, a headband 28 configured to rest on the top of the head of the user wearing the headset, and a part 30 supporting the headset to the head of the user at the ear opposite the ear where the earphone 20 is placed. The headset 2 may further comprise a detecting means 8, which may detect the vicinity of the second system part(s) 3. The detecting means 8 may for example be a received signal strength indicator (RSSI) performing RSSI measurements, infra-red (IR) detecting means, and/or radio-frequency identification (RFID) means. The headset 2 may further comprise an alert means 10, which may provide an audio alert to the user through the earphone 20.

The second system part 3 comprises two parts, a primary second system part 3 and a secondary second system part 3'.

The primary second system part 3 illustrated as a headset base 3 comprising a bottom 40, a stand 32 for holding the headset 2 when the headset is not in use on the users head, a display 42 comprising a screen 44. The screen 44 may be configured for displaying visual alerts such as text or flashing light to the user by means of alert means 11, when a detecting means 9 of the base 3 has detected a certain vicinity of the headset 2, and the headset 2 and the base 3 operates in a wireless mode. The detecting means 9 may for example be a received signal strength indicator (RSSI) performing RSSI measurements, infra-red (IR) detecting means, and/or radio-frequency identification (RFID) means.

The primary second system part 3, e.g. the headset base 3, may alternatively and/or additionally be termed an intermediary system part 3, as it is arranged between the other two system parts, e.g. the headset 2 and the pc 3'.

The secondary second system part 3' is illustrated as a personal computer (pc) 50 comprising a display 52 comprising a screen 54. The screen 54 may be configured for displaying visual alerts such as text or flashing light to the user by means of alert means 11, when a detecting means 9 of the pc 3' has detected a certain vicinity of the headset 2, and the headset 2 and the pc 3 operates in a wireless mode. The detecting means 9 may for example be a camera on the pc 3'. The detecting means 9 may for example be a received signal strength indicator (RSSI) performing RSSI measurements, infra-red (IR) detecting means, and/or radio-frequency identification (RFID) means. The pc 3' may additionally or alternatively be configured for providing audio alerts to the user by means of for example a loudspeaker (not shown) in the pc. Thus both the primary and the secondary second system part 3, 3' are configured for detecting a certain vicinity of the headset by means of detecting means 9. Further, both the primary and the secondary second system part 3, 3' are configured for alerting a user based on the detected vicinity by means of alert means 11.

The headset 2 and the headset base 3 are configured to be connected in the wireless mode 16 by means of a first transceiver 7 in the headset and a second transceiver 5 in the headset base 3.

The headset 2 and the headset 3 are configured to be connected in a corded mode 18 by means of a cord or wire connecting a first connector part 4 in the headset 2 and a second connector part 6 in the headset base 3.

The headset base 3 and the pc 3' are configured to be connected in a corded mode by means of a cord or wire 19 connecting a third connector part 46 in the headset base 3 with a fourth connector part 56 in the pc 3'.

The wireless mode 16, e.g. shown in FIGS. 1, 3 and 4, may be provided via a radio connection, such as a connection according to any wireless standard, such as a Bluetooth standard and/or such as a digital enhanced cordless telecommunication (DECT) standard specifically configured for voice communication.

Figure 5:
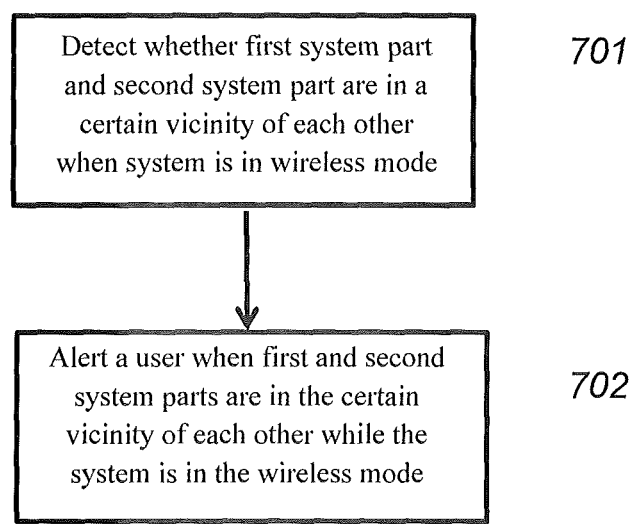
FIG. 5 illustrates a flowchart of a method performed in a hands free communication system.

FIG. 5 illustrates a flowchart of a method performed in a hands free communication system 1. The hands free communicating system may be a system of FIG. 1, FIG. 2, FIG. 3 and/or FIG. 4. The hands free communication system 1 comprises a first system part 2 and a second system part 3. The first system part 2 comprises a first connector part 4 and a first transceiver 7. The second system part 3 comprises a second connector part 6 and a second transceiver 5. The first system part 2 and the second system part 3 are configured to be connected in a corded mode 18 by means of the first and second connector parts 4, 6. The first system part 2 and the second system part 3 are configured to be connected in a wireless mode 16 by means of the first and second transceivers 7, 5.

The method comprises a number of steps.

In step 701 the first system part 2 and the second system part 3 detect whether they are in a certain vicinity of each other, when the hands free communication system 1 is in the wireless mode 16, by means of detecting means 8, 9 in the hand free communication system 1.

In step 702 a user of the hands free communication system 1 is alerted, when the detecting means 8, 9 detects that the first and second system parts 2, 3 are within the certain vicinity of each other while the hands free communication system 1 is in the wireless mode 16, by means of alert means 10,11 in the hands free communication system.

Figure 6:
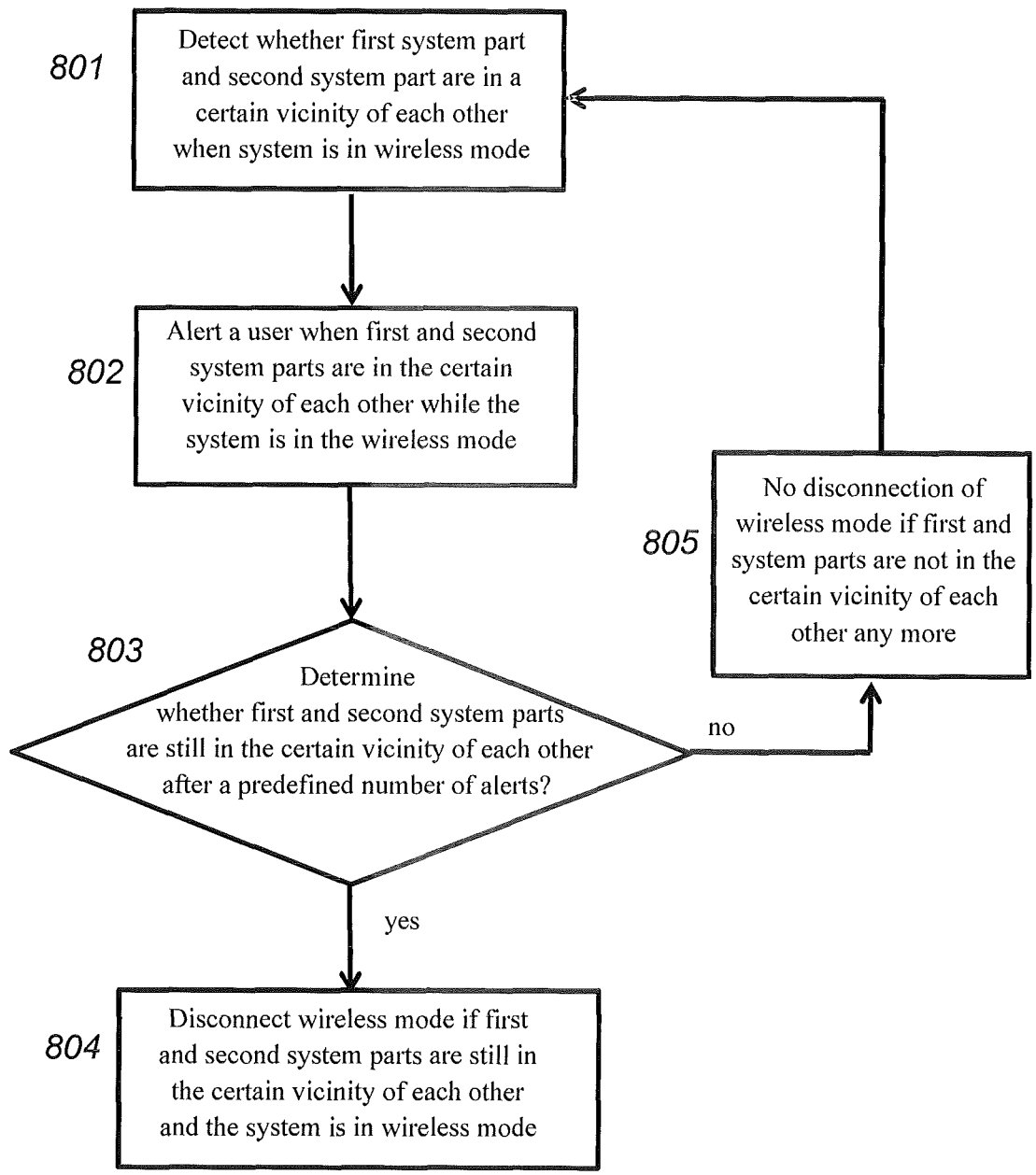
FIG. 6 illustrates a flowchart of a method performed in a hands free communication system.

FIG. 6 illustrates a flowchart of a method performed in a hands free communication system 1. The hands free communicating system may be a system of FIG. 1, FIG. 2, FIG. 3 and/or FIG. 4. The hands free communication system 1 comprises a first system part 2 and a second system part 3. The first system part 2 comprises a first connector part 4 and a first transceiver 7. The second system part 3 comprises a second connector part 6 and a second transceiver 5. The first system part 2 and the second system part 3 are configured to be connected in a corded mode 18 by means of the first and second connector parts 4, 6. The first system part 2 and the second system part 3 are configured to be connected in a wireless mode 16 by means of the first and second transceivers 7, 5.

The method comprises a number of steps.

In step 801 the first system part 2 and the second system part 3 detect whether they are in a certain vicinity of each other, when the hands free communication system 1 is in the wireless mode 16, by means of detecting means 8, 9 in the hand free communication system 1.

In step 802 a user of the hands free communication system 1 is alerted, when the detecting means 8, 9 detects that the first and second system parts 2, 3 are within the certain vicinity of each other while the hands free communication system 1 is in the wireless mode 16, by means of alert means 10,11 in the hands free communication system.

In step 803 the hands free communication system 1 determines whether the first 2 and second 3 system parts are still in the certain vicinity of each other after a predefined number of alerts.

If the first 2 and second 3 system parts are still in the certain vicinity of each other, then the wireless mode 16 is disconnected is the system is still in the wireless mode 16 in step 804.

If the first 2 and second 3 system parts are not in the certain vicinity of each other anymore, the wireless mode 16 is not disconnected in step 805.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES

1 hands free communication system
2 first system part
3 second system part 4 first connector part
5 second transceiver
6 second connector part
7 first transceiver
8 detecting means
9 detecting means
10 alert means
11 alert means
16 wireless mode
18 corded mode
19 cord or wire
20 earphone
22 microphone boom
28 headband
30 part supporting the headset to the head of the user at the ear opposite the ear where the earphone 20 is placed
32 stand of headset base
40 bottom of headset base
42 display of headset base
44 screen of headset base
46 third connector part
50 personal computer (pc)
52 display of pc
54 screen of pc
56 fourth connector part
701-702 method steps
801-805 method steps

The invention claimed is:

1. A hands free communication system comprising a first system part and a second system part, intended to detect the presence of a user proximate said first system part and to alert the user relinquish a wireless connection in favor of a corded connection,
wherein
the first system part comprises a first connector part and a first transceiver, and
the second system part comprises a second connector part and a second transceiver,
whereby the first system part and the second system part are configured to be connected in a corded mode by the first and second connector parts, whereby the first system part and the second system part are configured to be connected in a wireless mode by the first and second transceivers, wherein the hands free communication system comprises a detector for detecting whether the first system part and the second system part are in a certain vicinity of each other, when the hands free communication system is in the wireless mode,
and wherein,
the hands free communication system comprises an alert to alert a user of the hands free communication system, when the detector detects that the first and second system parts are within the certain vicinity of each other while the hands free communication system is in the wireless mode; so that the user will be alerted to relinquish the wireless connection in favor of a corded connection when within said certain vicinity.

2. The hands free communication system according to claim 1, wherein the alert is configured to provide a predefined number of alerts.

3. The hands free communication system according to claim 1, wherein each alert includes a predefined number of alerts and wherein each successive alert is configured to be intensified relative to the previous alert.

4. The hands free communication system according to claim 1, wherein each alert includes a predefined number of alerts and wherein each successive alert is configured to be provided within a shorter time interval than the time interval between the previous alerts.

5. The hands free communication system according to claim 1, wherein the wireless mode is provided via a radio connection, such as a connection according to any wireless standard, such as a Bluetooth standard and/or such as a digital enhanced cordless telecommunication (DECT) standard specifically configured for voice communication.

6. The hands free communication system according to claim 1, wherein the detector is provided in the first system part and/or in the second system part.

7. The hands free communication system according to claim 1, wherein the alert is provided in the first system part and/or in the second system part.

8. The hands free communication system according to claim 1, wherein the alert is an audio alert.

9. The hands free communication system according to claim 1, wherein the alert is a visual alert.

10. The hands free communication system according to claim 1, wherein the detector is configured to detect the certain vicinity as a presence and/or proximity between the first system part and the second system part.

11. The hands free communication system according to claim 1, wherein each alert includes a predefined number of alerts; and wherein if the detector detects that the first system part and the second system part are not in a certain vicinity of each other anymore before the predefined number of alerts is provided, the wireless mode is not disconnected.

12. The system according to claim 1, wherein the first system part is a headset.

13. The system of claim 1 wherein said detector detects the presence of the user by detecting user interaction with said first part.

14. The system of claim 1 wherein said detector detects the presence of the user by the presence of an RFID in said second part and an RFID detector in said first part.

15. The system of claim 1 wherein said first part includes a computer and wherein said detector detects the presence of the user interaction with the computer, thereby indicating that the user is proximate the first part.

16. The system of claim 1 wherein when the alert is detects the presence of the second part a predetermined number of successive time, the wireless mode connection is terminated, thereby motivating the user to reconnect by corded mode and thereby free up a wireless channel.

17. The system of claim 1 wherein the alert is an audible voice message which is successively made louder with subsequent successive alerts.

18. A hands free communication system comprising a first system part and a second system part, wherein
the first system part comprises a first connector part and a first transceiver, and the second system part comprises a second connector part and a second transceiver,
whereby the first system part and the second system part are configured to be connected in a corded mode by the first and second connector parts, whereby the first system part and the second system part are configured to be connected in a wireless mode by the first and second transceivers, wherein the hands free communication system comprises a detector for detecting whether the first system part and the second system part are in a certain vicinity of each other, when the hands free communication system is in the wireless mode,
and wherein,
the hands free communication system comprises an alert to alert a user of the hands free communication system, when the detector detects that the first and second system parts are within the certain vicinity of each other while the hands free communication system is in the wireless mode and, wherein the wireless mode is configured to be disconnected, if the first and second connector parts are not connected after a predefined number of repeated alerts requesting the user to connect the first system part and the second system part.

19. A method of managing wireless network availability in between a first system part and a second system part, having a first system part and a second system part the second system part being proximate the user and, wherein the first system part comprises a first connector part and a first transceiver, where the second system part comprises a second connector part and a second transceiver, where the first system part and the second system part are configured to be connected in a corded mode by the first and second connector parts, where the first system part and the second system part are configured to be connected in a wireless mode by the first and second transceivers, the method comprises:
  detecting whether the first system part and the second system part are within a certain vicinity of each other, when the first and second parts are wirelessly connected
  if the first and second parts are within said certain vicinity, then alerting the user to manually connect the first and second parts by said corded mode and thereby automatically disconnecting the first and second parts by wireless mode, and thereby freeing wireless network channels for other users.

20. A hands free communication system comprising
a first base system part including a computer and a second user-carried system part, wherein
the first system part includes a first hardwire connector part and a first transceiver, and the second system part comprises a second hard-wire connector part and a second transceiver,
wherein the first system part and the second system part are configured to be connectable in a hardwired mode by the first and second connector parts,
wherein the first system part and the second system part are configured to be connected in a wireless mode by the first and second transceivers,
wherein the hands free communication system further includes
a detector for detecting whether the first system part and the second system part are within a predetermined proximity of each other, by detecting user activity which engages the base system part when the hands free communication system is in the wireless mode; and
an alert generator configured to issue an alert when the detector detects that the first and second system parts are within said predetermined distance of each other when in the wireless mode;
so that the user is alerted to the opportunity to connects said first parts and thereby disconnect the wireless mode.

\* \* \* \* \*